United States Patent
Buras et al.

(10) Patent No.: US 6,927,245 B2
(45) Date of Patent: Aug. 9, 2005

(54) DISPERSING AGENT AND METHOD FOR THE DELIVERY OF CROSS-LINKING AGENT TO POLYMER MODIFIED ASPHALT COMPOSITIONS

(75) Inventors: Paul Buras, West University Place, TX (US); James R. Butler, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 39 days.

(21) Appl. No.: 10/454,001

(22) Filed: Jun. 4, 2003

(65) Prior Publication Data

US 2004/0249024 A1 Dec. 9, 2004

(51) Int. Cl.⁷ .................................................. C08L 95/00
(52) U.S. Cl. ............................. 524/68; 524/59; 524/69; 524/70; 524/71
(58) Field of Search ................................ 524/59, 68–71

(56) References Cited

U.S. PATENT DOCUMENTS

| | | |
|---|---|---|
| 5,904,760 A | 5/1999 | Hayner |
| 5,990,206 A * | 11/1999 | Tanaka et al. ................. 524/59 |
| 6,133,351 A | 10/2000 | Hayner |
| 6,133,378 A | 10/2000 | Davis et al. |
| 6,153,004 A | 11/2000 | Hayner |
| 6,335,304 B1 | 1/2002 | He et al. |

\* cited by examiner

*Primary Examiner*—Peter Szekely
(74) *Attorney, Agent, or Firm*—Hitt, Gaines, P.C.; Tenley R. Krueger

(57) ABSTRACT

The present invention provides a dispersing agent that facilitates the delivery of a cross-linking agent to polymer modified asphalt. The present invention further includes a composition comprising a liquid hydrocarbon, the dispersant and cross-linking agent, and methods of preparing the composition and of preparing cross-linked polymer modified asphalt composition.

16 Claims, No Drawings

DISPERSING AGENT AND METHOD FOR THE DELIVERY OF CROSS-LINKING AGENT TO POLYMER MODIFIED ASPHALT COMPOSITIONS

TECHNICAL FIELD OF THE INVENTION

The present invention is directed, in general, to polymer modified asphalt compositions and their preparation, and more specifically, to a dispersing agent that improves the delivery of crossing linking agents to polymer modified asphalt compositions.

BACKGROUND OF THE INVENTION

To be used in road materials, asphalt must first meet certain specifications. For example, as a result of the Strategic Highway Research Program (SHRP), the Federal Highway Administration (FHWA) has developed a battery of tests and specifications for asphalt, known as the Superpave binder specification and test methods, designed to ensure that road materials have a longer lifetime before repair. Such specifications, referred to herein as the SHRP tests, may be categorized as comprising high, intermediate and low temperature Performance Grade (PG) tests. In addition, some agencies have adopted Compatibility tests to prevent separation of polymer and asphalt.

If a particular sample of asphalt produced in an oil refinery does not pass minimum specifications for all of the above-described SHRP tests, including compatibility testing, then the asphalt is not acceptable for use as road material. Various techniques have therefore been developed to alter the rheological properties of asphalt, so that it will meet the minimum requirements of the SHRP tests.

For example, a polymer, such as rubber, may be added to asphalt to produce polymer modified asphalt (PMA) in order to improve the asphalt's rheological properties so that the product meets specified limits at the required temperatures. PMA can also be used in asphalt emulsions, seal coats, joint fillers. PMA may also be used in other applications beyond paving materials, such as roofing asphalt and waterproofing materials or other material well known to those skilled in the art. Certain PMAs may fail the compatibility test, however. This, in turn, may necessitate further processing, such as cross-linking the polymer to thereby improve the PMA's compatibility test score. For example, a well-known means to introduce cross-links into PMAs containing rubber involves heating the rubber in the presence of a crossing linking agent, such as Sulfur. The cross linking process, commonly known as vulcanization, results in the production of sulfide bonds between the unsaturated double bond portions of rubber. The network of cross-linked rubber formed throughout the PMA improves the PMA's rheologic properties, and more importantly, improves the compatibility test score of the PMA.

In the setting of an asphalt production plant, the efficient and safe delivery of Sulfur to PMA may be problematic. The handling of large quantities of powdered Sulfur, for example, may present significant fire, explosion and health hazards to plant workers. Moreover, it may be difficult to mix powdered Sulfur into PMA in a uniform fashion. Alternatively, the Sulfur may be incorporated into an aqueous-based emulsion and then delivered to the PMA. Because such Sulfur containing aqueous emulsions are being delivered to hot asphalt and maintained at about 350° F. (177° C.), large amounts of steam are generated. The generation of steam laden with Sulfur-based compounds, such as hydrogen sulfide, generates health risks, thus necessitating an expensive and efficient venting system. Moreover, when aqueous emulsions contact asphalt, the asphalt will foam, thereby having a deleterious effect on the preparation of the PMA. Although the incorporation of Sulfur into an oil-based emulsion helps avoid the formation of steam and foam, other difficulties remain.

For example, the addition of powdered sulfur to the vapor space of a hydrocarbon tank results in free-floating dust which can stick to and build up on the interior surface of a hydrocarbon tank. Sulfur dust can also react with hydrocarbon vapors and cause further deposits on the interior surfaces of the tank. These deposits require periodic cleanout, can result in insoluble foreign matter in asphalt, and also represent a potential fire hazard. In addition, the slow mixing and dispersion of solid sulfur into PMA can result in localized high concentrations of sulfur resulting in excessive cross-link density and formation of insoluble material and/or gelling (rapid increase in viscosity) of the asphalt.

Furthermore, cross-linking agents, such as Sulfur separate out of certain aqueous or oil-based emulsions, and settles to form a sludge. Sludge formation, in turn, may impair the consistent delivery of cross-linking agent to PMA, resulting in the nonuniform formation of cross-links in the PMA. And, once sludge comprising the bulk of cross-linking agent forms at the bottom of aqueous or oil emulsions, it is extremely difficult to cost effectively resuspend the cross-linking agent. Thus, such emulsions may have undesirably short shelf lives (i.e., less than one day). This, in turn, burdens the costs and logistics of producing cross-linked PMA having acceptable performance grade and compatibility properties.

Accordingly, what is needed in the art is a polymer modified asphalt composition having uniform cross-linking facilitated by the efficient delivery of Sulfur to the asphalt, while not experiencing the above-mentioned problems.

SUMMARY OF THE INVENTION

To address the above-discussed deficiencies, the present invention provides, in one embodiment, a composition for cross-linking polymer modified asphalt. The composition comprises asphalt, a polymer, a cross-linking agent and a dispersant. The dispersant is described by the formula: NP-P, where NP and P are covalently linked functional groups, P is capable of having noncovalent attractive interactions with the cross-linking agent, and NP is capable of having noncovalent attractive interactions with a liquid hydrocarbon. Another embodiment of the present invention provides a method of preparing a composition for cross-linking polymer modified asphalt. The method comprises providing a liquid hydrocarbon and adding a dispersant to the liquid hydrocarbon. The liquid hydrocarbon is heated and stirred at a first blending speed, temperature and period sufficient to blend the dispersant into the liquid hydrocarbon. A cross-linking agent is added to the liquid hydrocarbon while heating and stirring the liquid hydrocarbon at a second blending speed, temperature and period sufficient to blend the cross-linking agent into the liquid hydrocarbon.

In yet another embodiment, the present invention provides a method of preparing a cross-linked polymer modified asphalt (PMA) composition. A stock composition is prepared using the above-described method. A PMA is prepared by adding a polymer to asphalt while stirring and heating the asphalt at a third blending speed, temperature and period sufficient to blend the rubber into the asphalt. A portion of the stock composition is added to the PMA while stirring and heating the PMA at fourth blending speed, temperature and period sufficient to allow substantial cross-linking of the polymer.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the scope of the invention.

DETAILED DESCRIPTION

The present invention is directed to a dispersant that facilitates the delivery of cross-linking agents to polymer modified asphalt (PMA). The term dispersant as used herein refers to a compound, that when added to a mixture of a liquid hydrocarbon phase and a dispersed phase, the dispersant facilitates the suspension of the dispersed phase in the liquid hydrocarbon phase. In the present invention, the dispersed phase comprises cross-linking agents, while the liquid hydrocarbon phase comprises oil, as further described below. The dispersants of the present invention circumvent the problems encountered with the use of aqueous and oil emulsions and oil dispersions. For example, the dispersants of the present invention extend the period that cross-linking agents remain suspended, as compared to aqueous and oil-based emulsions. In turn, this allows for a more uniform delivery of cross-linking agent to PMA, and a longer shelf-life of a stock composition of cross-linking agent.

The term rubber as used herein, refers to any thermoplastic elastomeric product with unsaturated bonds suitable for vulcanization, such as diene rubbers and copolymers produced from styrene and butadiene. Thermoplastic elastomers suitable for the production of PMAs, such as copolymers, are well known to those skilled in the art, and are either commercially available, or can be prepared from methods known in the art. Styrene-butadiene-styrene (SBS) rubbers such as Finaprene® FP-401 or FP-502, available from ATOFINA Petrochemicals (Houston Tex.), are suitable for such applications. Such rubbers may range, for example, in number average molecular weights from about 30,000 to about 300,000 gm/mol, and have radial or linear structures. Any conventional rubber may be used, however, that is compatible with the system used for producing PMA.

The term liquid hydrocarbon refers to any carbon containing compounds, for example, crude oil extracted from the earth, having a flash point of greater than about 350° F. (177° C.) and preferably about 450° F. (232° C.). Certain flux oils are suitable for use as the liquid hydrocarbon phase. Flux oil as used herein refers to a petroleum oil lighter than asphaltenes, used to soften asphalt to a desired consistency. Alternatively, various commercial oils, such as lube oil extracts like Sunpave 125 (Sunoco, Philadelphia, Pa.), are suitable for the liquid hydrocarbon phase of the present invention. Aromatic, paraffinic, or naphthenic oils, recycled used oil bottoms, or other gas oils having an adequate viscosity and flash point could be used.

A number of other terms in the asphalt industry as used herein are well known to those skilled in-the art. Asphaltenes as used herein refers to the heavy oils, such as propane insoluble raffinates, also known as pitch, remaining after refining crude oil to remove lighter oils. Asphalt, also known as bitumen, as used herein refers to mixtures of asphaltene and flux oil, the asphalt thereby serving as a binder for the road material. Road materials, also known as hot mix, as used herein refers to mixtures of asphalt and rocks, also known as aggregate.

For additional explanations of these terms, as well as the test equipment, and rheological tests described below, reference is made to SUPERPAVE Series No. 1 (SP-1), (1997 printing), published by the Asphalt Institute (Research Park Drive, P.O. Box 14052, Lexington, Ky. 40512-4052) (hereinafter, "SUPERPAVE booklet"), which is hereby incorporated by reference in its entirety. Rolling Thin Film Ovens (RTFO) and Pressure Aging Vessels (PAV) are used to simulate binder aging (hardening) characteristics. Dynamic Shear Rheometers (DSR) are used to measure binding properties of asphalt at high and intermediate temperatures. This, in turn, is used to predict permanent deformation or rutting and fatigue cracking of road material. Bending Beam Rheometers (BBR) are used to measure binder properties at low temperatures. These values predict thermal or low temperature cracking.

Asphalt grading is given in accordance with accepted standards in the industry, as discussed in the SUPERPAVE booklet. Asphalt compositions are assigned certain performance grades, for example, PG 64–22. As further explained below, the first number, 64, represents the average 7-day maximum pavement design temperature in ° C. The second number, –22, represents the minimum pavement design temperature in ° C. The test requirements to meet a certain performance grade are discussed in the SUPERPAVE booklet. Asphalts are typically designated according to their maximum and minimum design temperatures. For example, a designation of PG 64–22, means that the high temperature PG test was passed at 64° C., and the intermediate and low temperature PG tests were passed at temperatures corresponding to –22° C. The principles and procedures for these measurements as applied in the present invention are further described below, and in the SUPERPAVE booklet.

High and intermediate temperature PG tests both involve Dynamic Mechanical Analysis testing, specifically, DSR, to measure the asphalt's rheologic properties (ASTM P246). The high temperature test (designated as the DSR test) involves applying a torsional stress to a disk comprised of asphalt. A parameter, $G^*/\sin(\delta)$, is obtained, where $G^*$ refers to the complex shear modulus and $\delta$ is the phase angle offset between the applied stress and response of the material. $G^*/\sin(\delta)$ provides a measure of the asphalt's stiffness at the upper range of its service temperature. This, in turn, is thought to reflect the rutting resistance of road material containing the asphalt.

A particular PG designation specifies the temperature at which a certain minimum torque, as defined by SHRP test specifications, is reached under conditions for the DSR test. For example, an asphalt designated as PG64, indicates that a minimum torque of 1.0 kPa is reached at 64° C.; if the asphalt is associated with a lower torque, then the asphalt fails the test at this temperature. Moreover, in order to meet a certain high temperature PG designation, analogous additional tests (herein designated as the RTFO-DSR test) must also be passed after aging the asphalt in a RTFO.

The intermediate temperature PG test is conducted on asphalt already subjected to aging as part of the RTFO-DSR test, plus additional aging at a particular elevated temperature and pressure in a PAV, as designated by SHRP test specifications. The test (herein designated as the PAV-DSR test) is conducted at intermediate temperatures (e.g., between about 20° C. and 30° C.). The resulting parameter, G*•sin(δ), also provides a measure of stiffness. This, in turn, is thought to be relatable to the fatigue resistance of road material containing the asphalt.

The low temperature PG test (designated herein as the BBR test), is conducted at temperatures ranging from about 0° C. to −18° C. (with extrapolation to lower temperature values), in order to assess the asphalt's low temperature rheologic properties. (ASTM P245). The test involves applying a weight load to an asphalt sample formed into a beam at various temperatures. The deflection provides a means of determining creep stiffness, which is designated herein as the S-value, and the rate of change in creep stiffness, which is designated herein as the M-value. Both the S-value and M-value are thought to provide an indication of the low temperature cracking resistance of road material containing the asphalt.

Analogous to the above-described DSR test, the PAV-DSR and BBR test results are expressed in terms of a temperature at which a certain minimum value is obtained. And, for the purposes of evaluating asphalt samples, the specific temperatures at which the PAV-DSR test is conducted are directly related to a parallel set of temperatures at which the BBR test is conducted. Thus, to receive a certain low temperature PG designation, for example, PG-22, the asphalt must pass both the PAV-DSR and BBR tests at their respective related temperatures of 25° C. and −22° C., respectively.

Compatibility tests provide a measure of the degree of separability of materials comprising the asphalt. The long-term compatibility between rubber and the other components of PMA, for example, is an important consideration when preparing road material. If rubber is not compatible with the other components of PMA, then the performance of road materials containing PMA is degraded. Compatibility is assessed by measuring the softening point of asphalt after a period of thermally-induced aging (for example, Louisiana DOTD Asphalt Separation of Polymer Test Method TR 326). Typically, an asphalt sample, such as PMA, is placed into an aluminum tube and then aged by heating the tube for 24 or 48 hours at a standardized temperature, for example, 162° C. After the aging process, the tube is allowed to cool while being maintained in a vertical position, and then cut into three equal sections. Top and bottom sections from the tube are then compared for differences in their softening point using the Ring and Ball (RB) test. The RB test measures the deformation of the sections in response to an applied force at different temperatures. The softening point refers to the temperature at which a section deforms by more than 1" (2.54 cm). If the difference in softening points between the top and bottom section is less than about 4° F. (2° C.) then the PMA is considered to have acceptable compatibility. In contrast, rubber that is incompatible with other components in PMA will tend to separate to the top section, as indicated by a softening point that is substantially lower (i.e., >4° F. or >2° C.) than the softening point of the lower section.

Certain dispersants of the present invention are known for their use in water treatment applications, in particular, the suspension of particles comprising salts and other contaminants present in water, so that, for example, the particles will not settle in heat exchangers or similar devices. It has not been previously recognized, however, that such dispersants could be used to improve the suspension of cross-linking agents, such as Sulfur, in hydrocarbon liquids.

While not limiting the scope of the present invention by theory, it is believed that the dispersants contain two or more functional groups that are attracted to the dispersed phase and the liquid hydrocarbon phase, respectively. The attractive forces may involve associative bonding that is enhanced when the polarity or electronegativity of certain functional groups match either that of the dispersed phase or the liquid hydrocarbon phase. When the associative forces are sufficiently strong, the cross-linking agent is suspended in the liquid hydrocarbon. It is thought that the associative forces impart a favorable kinetic effect, whereby the cross-linking agent is dispersed in the liquid hydrocarbon for a longer period than in a dispersant-free liquid hydrocarbon. Any conventional detergent or soap may be used for this process. When the dispersant is 2-ethylhexyl acid phosphate, for instance, it is thought that the acid phosphate functional group is attracted to a polar cross-linking agent, such as Sulfur. And, the 2-ethylhexyl functional group is attracted to the nonpolar long chain alkanes and other polar compounds, present in the hydrocarbon solvent.

One embodiment of the present invention is directed to dispersants exemplifying the above-discussed properties. The dispersant comprises compounds having the general formula: NP-P. NP and P are covalently linked. P refers to a functional group capable of having noncovalent attractive interactions with a cross-linking agent comprising the dispersed phase. For example, P may have polar interactions with the cross-linking agent. Or, the electronegativity of P may match that of the cross-linking agent. In certain embodiments of the present invention, P may comprise functional groups including alcohols, quaternary amines, carbonates, sulfates and nitrates. In certain preferred embodiments, P may comprise phosphate.

NP refers to functional groups capable of having noncovalent attractive interactions with a liquid hydrocarbon phase. Such interactions may be promoted by polarity or electronegativity matching between the NP group and the liquid hydrocarbon. In certain embodiments of the present invention, NP may comprise functional groups including hydrocarbon groups having between about 8 carbons and about 30 carbons. In certain preferred embodiments, NP may comprise a 2-ethylhexyl group.

The cross-linking agents of the present invention comprise any compound added to PMA that facilitate the formation of cross-links between polymer chains within the PMA. The cross-linking agent, for example, may include any Group VIA elements capable of such cross-linking, and desirably, elemental Sulfur. Other Sulfur donating compounds, however, for example, thiazoles, dithiocarbamate, sulphenimides, sulphenamides, guanidines, dithiophosphates, or thiurams may serve as the cross-linking agent. Other crosslinking agents include phenolic resins, metal oxides, fatty acids, fatty acid salts. Cross-linking agents may also include accelerators and activators, well known those skilled in the art, to improve the efficiency of the cross-linking reaction. Accelerators may include, for example, 2-mercaptobenzothiazole (MBT), tetraalkylthiuram disulfides, 1,3-diarylguanidines or combinations thereof. Activators may include, for example, metal oxides (for example, zinc oxide, magnesium oxide, calcium oxide, copper oxide or lead oxide), fatty acids, or fatty acid salts (for example, zinc stearate or zinc laurate) used alone or in combination with accelerators (e.g., zinc 2-mercaptobenzothiazole or zinc dialkyldithiocarbamates).

The cross-linking agent added to the liquid hydrocarbon containing the dispersant is preferably in powder form. For example, in certain preferred embodiments the cross-linking agent is in a powder form known as flowers of Sulfur. The cross-linking agent, when in a powder form, has a particle diameter of less than about 100 μm, and preferably less than about 50 μm.

Another embodiment of the present invention is a method for preparing stock slurries of cross-linking agent in the mixture of the dispersant and liquid hydrocarbon. The dispersant is added to the liquid hydrocarbon to provide a concentration of dispersant ranging from about 0.1 to about 10 weight percent, preferably about 7 weight percent.

To prepare a stock composition of cross-linking agent, a cross-linking agent is added, preferably in powder form, to the mixture of dispersant and liquid hydrocarbon, to provide a cross-linking agent concentration ranging from about 10 to about 70 weight percent, and preferably about 50 weight percent. In certain preferred embodiments the cross-linking agent may include accelerators and activators in amounts well known to those skilled in the art. For example, if the cross-linking agent is Sulfur, the accelerator may be MBT, and the activator may be zinc oxide, and the ratio of cross-linking agent:accelerator:activator, may correspond to about 2:1:1. In certain preferred embodiments, the cross-linking agents are added to a pre-made mixture of dispersant and oil. It is possible, however, to mix the dispersant and cross-linking agent into the oil at the same time, or mix all ingredients at the same time, and still obtain an adequate suspension of cross-linking agent.

Yet another embodiment of the present invention, is a method of preparing cross-linked PMA, as facilitated by using the dispersant of the present invention. PMA may be prepared using conventional methods by mixing a polymer, for example, rubber into asphalt while heating and stirring the asphalt at a speed, temperature and period sufficient to blend the rubber into the asphalt. In certain preferred embodiments, the rubber comprises from about 1 to about 12 weight percent of the asphalt, and preferably 5 weight percent.

Sufficient amounts of a stock slurry compistion containing the dispersant, liquid hydrocarbon and cross-linking agent are added to provide sufficient amounts of cross-linking agent to cross-link the polymer. The stock slurry composition may contain between about 1 percent by weight to about 70 percent by weight of the cross-linking agent, and preferably about 40 to about 60 percent. In certain preferred embodiments, when the cross-linking agent comprises Sulfur, for example, the final concentration of cross-linking agent added to the PMA ranges from about 0.05 to about 2 weight percent, and preferably about 0.2 weight percent. The cross-linking agent may be blended into the PMA using conventional methods, for example, by adding the stock composition into high and low shear mixers while heating and stirring the asphalt at speeds, temperatures and periods sufficient to blend the cross-linking agent into the PMA. After performing product specification tests to confirm that the PMA has an adequate performance grade and compatibility, the PMA may then be shipped to a hot mix plant for incorporation into road mix or other conventional asphalt applications.

Having described the present invention, it is believed that the same will become even more apparent by reference to the following experiments. It will be appreciated that the experiments are presented solely for the purpose of illustration and should not be construed as limiting the invention. For example, although the experiments described below were carried out in a laboratory or pilot plant, one skilled in the art could adjust specific numbers, dimensions and quantities up to appropriate values for a full scale plant.

EXPERIMENTS

One experiment was performed to evaluate the ability of a dispersant of the present invention to sustain the suspension of cross-linking agent. A second experiment was performed to assess the effectiveness of a cross-linking agent, suspended in a liquid hydrocarbon in the presence of dispersant, to cross-link PMA.

Experiment 1

The dispersant, 2-ethylhexyl acid phosphate, was added to a liquid hydrocarbon, Sunpave 125 oil (Sunoco, Philadelphia, Pa.), to provide a final concentration of 4.5% weight per volume. To the above mixture of dispersant and oil, a cross-linking agent, comprising a mixture of Sulfur, Zinc Oxide and MBT in a ratio of 2:1:1, was added, to provide a stock slurry composition (designated as Slurry A) having a cross-linking agent concentration of about 50 weight percent. For comparative purposes, a stock slurry composition (designated as Slurry B) was prepared with no dispersant present. The slurry was made by adding cross-linking agent, comprising Sulfur, zinc oxide and MBT, in a ratio of 2:1:1, to the same type of oil to provide the same total crosslinker content of 50 weight percent as described for Slurry A.

Slurries A and B were shaken at room temperature to provide homogenous mixtures. After mixing, portions of Slurry A and B were each poured into two 100 ml glass graduated cylinders, covered with aluminum foil, and placed in an undisturbed location. At daily intervals for up to twenty-one days, the cylinders were visually inspected to assess the extent of settling of cross-linking agent to the bottom, and separation of oil to the top, of the cylinder.

There were no signs of settling for Slurry A after two days. This was confirmed by the observation of less than about 1 percent of the volume of the material in the cylinder comprising a top layer composed substantially of clear oil. Alternative confirmation was provided by the observation of less than about 1 percent the volume of the material in the cylinder comprising a bottom layer composed substantially of solids. Thereafter, detectable settling was observed. For example, after twenty-one days, there was about 3 to 5 ml of solids at the bottom of the cylinder. And, a clear layer of about 6 ml of oil was on the top of the slurry, after the same period. Based on its white to pale yellow color, the solids were thought to be comprised mostly of ZnO or MBT, and not Sulfur. These solids easily remixed into the remaining slurry on pouring the material out of the cylinder.

In contrast, for Slurry B, detectable settling of solid material was observed after only one day. A clear layer of about 25 ml of oil was on the top of the cylinder after one day. And, after two days, the layer of oil was about 55 ml, representing substantially complete separation of oil and solid. Thus, in the absence of dispersant at least about 25% of the crosslinking agent settled out in about one day.

Experiment 2

To examine the ability of Slurry A to effectively cross-link polymer in asphalt, two samples of PMA were prepared. Both samples contained asphalt having a SHRP test value of PG66–22. PMA was prepared by adding rubber comprising either FP-401 SBS (sample designated as PMA-401) or FP-502 SBS (sample designated as PMA-502). The rubber concentration in the asphalt was 4 percent by weight for either sample. Blending of rubber into the asphalt was achieved by high shear mixing at 350° F. for 45 minutes. In the absence of cross-linking, both PMA-401 and PMA-502 are incompatible, as exemplified by a Compatibility Test value of about 50° F.

To initiate cross-linking, sufficient amounts of stock Slurry A was added to the PMA to make the final crosslinking agent concentration in the PMA equal to about 0.26 weight percent. Thus, the final concentration of Sulfur in the PMA equaled about 0.12 weight percent. Blending of crossing linking agent into the PMA was achieved by mixing in a conventional low shear mixer at 350° F. for one hour. After aging the PMA samples in an oven adjusted to 320° F. for 24 hours, compatibility testing was performed. The cross-linking of both PMA-401 and PMA-502 was evident from Compatibility Test values of about 7 and 0° F., respectively.

Although the present invention has been described in detail, those skilled in the art should understand that they can make various changes, substitutions and alterations herein without departing from the scope of the invention.

What is claimed is:

1. A composition for cross-linking polymer modified asphalt comprising:
   asphalt;
   a polymer;
   a cross-linking agent selected from the group consisting of elemental sulfur, elemental selium, elemental tellurium, thiazoles, dithiocarbamates, sulphenimides, guanidines, thiurams, phenolic resins, metal oxides, fatty acids and fatty acid salts; and
   a dispersant having the formula: NP-P, where NP and P are covalently linked functional groups, P is capable of having noncovalent attractive interactions with said cross-linking agent, and NP is capable of having noncovalent attractive interactions with a liquid hydrocarbon.

2. A composition for cross-linking polymer modified asphalt comprising:
   asphalt;
   a polymer;
   a cross-linking agent; and
   a dispersant comprising 2-ethylhexyl acid phosphate.

3. A method of preparing a composition for cross-linking polymer modified asphalt comprising:
   providing a liquid hydrocarbon;
   adding a dispersant to said liquid hydrocarbon while heating and stirring said liquid hydrocarbon at a first blending speed, temperature and period sufficient to blend said dispersant into said liquid hydrocarbon, said dispersant having the formula: NP-P, where NP and P are covalently linked functional groups, P is capable of having noncovalent attractive interactions with said cross-linking agent, and NP is capable of having noncovalent attractive interactions with said liquid hydrocarbon; and
   adding a cross-linking agent to said liquid hydrocarbon while heating and stirring said liquid hydrocarbon at a second blending speed, temperature and period sufficient to blend said cross-linking agent into said liquid hydrocarbon, wherein the cross-linking agent is selected from the group consisting of elemental sulfur, elemental selium, elemental tellurium, thiazoles, dithiocarbamates, sulphenimides, guanidines, thiurams, phenolic resins, metal oxides, fatty acids and fatty acid salts.

4. A method of preparing a composition for cross-linking polymer modified asphalt comprising:
   providing a liquid hydrocarbon;
   adding a dispersant to said liquid hydrocarbon while heating and stirring said liquid hydrocarbon at a first blending speed, temperature and period sufficient to blend said dispersant into said liquid hydrocarbon, said dispersant comprising 2-ethylhexyl acid phosphate; and
   adding a cross-linking agent to said liquid hydrocarbon while heating and stirring said liquid hydrocarbon at a second blending speed, temperature and period sufficient to blend said cross-linking agent into said liquid hydrocarbon.

5. A method for preparing a cross-linked polymer modified asphalt (PMA) composition comprising:
   preparing a stock composition by:
      adding a dispersant to a liquid hydrocarbon while heating and stirring said liquid hydrocarbon at a first blending speed, temperature and period sufficient to blend said dispersant into said liquid hydrocarbon, said dispersant having the formula: NP-P, where NP and P are covalently linked functional groups, P is capable of having noncovalent attractive interactions with a cross-linking agent, and NP is capable of having noncovalent attractive interactions with said liquid hydrocarbon; and
      adding a composition comprising the cross-linking agent together with an accelerator and an activator to said liquid hydrocarbon while heating and stirring said liquid hydrocarbon at a second blending speed, temperature and period sufficient to blend said cross-linking agent into said liquid hydrocarbon;
   preparing a PMA by adding a polymer to asphalt while stirring and heating said asphalt at a third blending speed, temperature and period sufficient to blend said rubber into said asphalt; and
   adding a portion of said stock composition to said PMA while stirring and heating said PMA at fourth blending speed, temperature and period sufficient to allow substantial cross-linking of said polymer.

6. A method for preparing a cross-linked polymer modified asphalt (PMA) composition comprising:
   preparing a stock composition by:
      adding a dispersant to a liquid hydrocarbon while heating and stirring said liquid hydrocarbon at a first blending speed, temperature and period sufficient to blend said dispersant into said liquid hydrocarbon, said dispersant having the formula: NP-P, where NP and P are covalently linked functional groups, P is capable of having noncovalent attractive interactions with a cross-linking agent, and NP is capable of having noncovalent attractive interactions with said liquid hydrocarbon; and
      adding a composition comprising sulfur, 2-mercaptobenzothiozole and zinc oxide to said liquid hydrocarbon while heating and stirring said liquid hydrocarbon at a second blending speed, temperature and period sufficient to blend said composition into said liquid hydrocarbon;
   preparing a PMA by adding a polymer to asphalt while stirring and heating said asphalt at a third blending speed, temperature and period sufficient to blend said rubber into said asphalt; and
   adding a portion of said stock composition to said PMA while stirring and heating said PMA at fourth blending speed, temperature and period sufficient to allow substantial cross-linking of said polymer.

7. The composition as recited in claim 1 wherein said cross-linking agent and said dispersant are suspended in said liquid hydrocarbon.

8. The composition as recited in claim 1 wherein at least about 80 percent of the total amount of said crosslinking agent in said composition remains suspended for least about 1 day.

9. The composition as recited in claim 1 wherein said P fuctional group is selected from the group consisting of:
- alcohols;
- quaternary amines;
- phosphates;
- carbonates;
- sulfates; and
- nitrates.

10. The composition as recited in claim 1 wherein said NP functional group comprise hydrocarbon groups having between about 8 and about 30 carbons.

11. The composition as recited in claim 1 wherein said dispersant comprises from 0.1 to 10 percent by weight of a total weight of said composition.

12. The method as recited in claim 3 wherein said dispersant and said cross-linking agent are simultaneously added to said liquid hydrocarbon while heating and stirring said liquid hydrocarbon at a third blending speed, temperature and period sufficient to blend said dispersant and said cross-linking agent into said liquid hydrocarbon.

13. The composition as recited in claim 3 wherein said P functional group is selected from the group consisting of:
- alcohols;
- quaternary amines;
- phosphates;
- carbonates;
- sulfates; and
- nitrates.

14. The composition as recited in claim 3 wherein said NP functional group comprise hydrocarbon groups having between about 8 and about 30 carbons.

15. The method as recited in claim 3 wherein said cross-linking agent is added to provide a concentration of about 10 percent by weight to about 70 percent by weight of said composition.

16. The method as recited in claim 5 wherein said cross-linking agent comprises from about 0.05 weight percent to about 2 weight percent of said PMA.

* * * * *